United States Patent [19]

Imayoshi

[11] Patent Number: 4,854,220
[45] Date of Patent: Aug. 8, 1989

[54] PULL-TYPE BOOSTER

[75] Inventor: Mamoru Imayoshi, Yokosuka, Japan

[73] Assignee: Nippon Air Brake Co., Ltd., Japan

[21] Appl. No.: 143,293

[22] Filed: Jan. 6, 1988

Related U.S. Application Data

[63] Continuation of Ser. No. 817,902, Jan. 10, 1986, abandoned.

[30] Foreign Application Priority Data

Jan. 18, 1985 [JP] Japan .................. 60-5118[U]

[51] Int. Cl.$^4$ .............................................. F15B 9/10
[52] U.S. Cl. ................................. 91/376 R; 91/369.1
[58] Field of Search .............. 91/369 A, 376 R, 369.1; 92/98 D; 60/547.1

[56] References Cited

U.S. PATENT DOCUMENTS

| | | | |
|---|---|---|---|
| 2,794,320 | 6/1957 | Rockwell | 91/376 R X |
| 3,150,493 | 9/1964 | Rike | 91/376 R X |
| 3,362,298 | 1/1968 | Julow | 60/547.1 X |
| 3,452,646 | 7/1969 | Abbott et al. | 91/369 A X |
| 3,786,903 | 10/1984 | Haga et al. | 192/91 R |
| 4,259,893 | 4/1981 | Ando et al. | 91/376 R X |
| 4,597,320 | 7/1986 | Kamio | 92/98 D X |
| 4,667,567 | 5/1987 | Morimoto | 91/376 R |

FOREIGN PATENT DOCUMENTS

| | | |
|---|---|---|
| 0154154 | 9/1985 | European Pat. Off. . |
| 156119 | 10/1985 | European Pat. Off. .......... 91/369 A |
| 140074 | 5/1975 | Japan . |
| 36183 | 8/1982 | Japan . |
| 800884 | 9/1958 | United Kingdom . |
| 939428 | 10/1963 | United Kingdom . |
| 2138521 | 10/1984 | United Kingdom . |

*Primary Examiner*—Robert E. Garrett
*Assistant Examiner*—Mark A. Williamson
*Attorney, Agent, or Firm*—Kane, Dalsimer, Sullivan, Kurucz, Levy, Eisele and Richard

[57] ABSTRACT

A pull-type booster includes a hollow body in which a movable wall is movably received to divide an interior thereof into a negative pressure chamber and a pressure-variable chamber. The movable wall has a tubular portion extending outwardly of the body and having an axial internal bore. The tubular portion is disposed in a room or chamber. A tubular cover member is mounted around the tubular portion to cover it and has an inlet in communication with the internal bore. An air tube has one end connected to the inlet, and the other end of the air tube is disposed outside of the room. A valve device is mounted within the internal bore for communicating the inlet with the pressure-variable chamber through the internal bore to introduce the ambient air outside of the room into the pressure-variable chamber via the air tube when the valve device is in a pressure-differential generating position, thereby moving the movable wall relative to the body due to a pressure differential between the negative pressure chamber and the pressure-variable chamber.

7 Claims, 2 Drawing Sheets

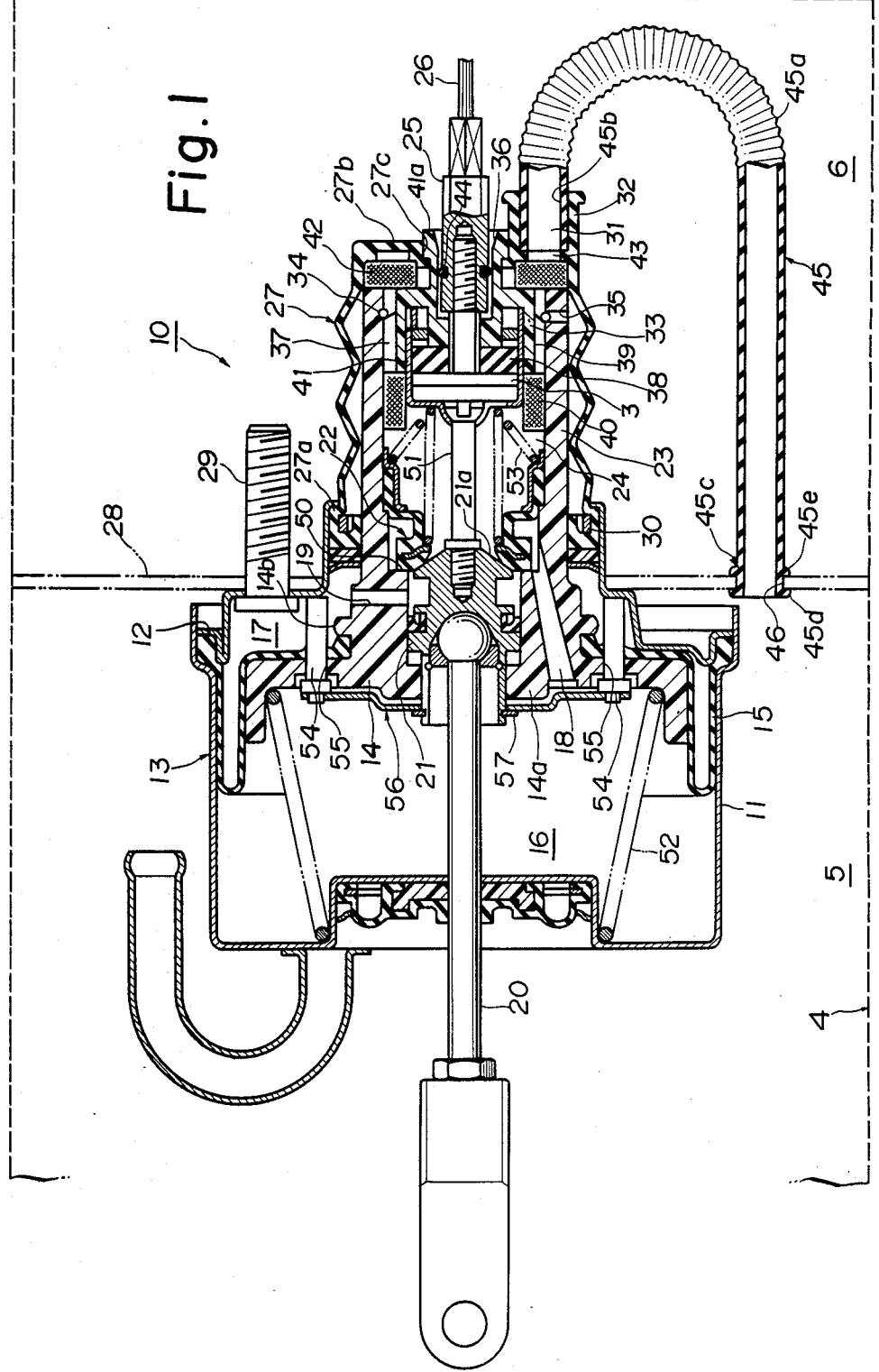

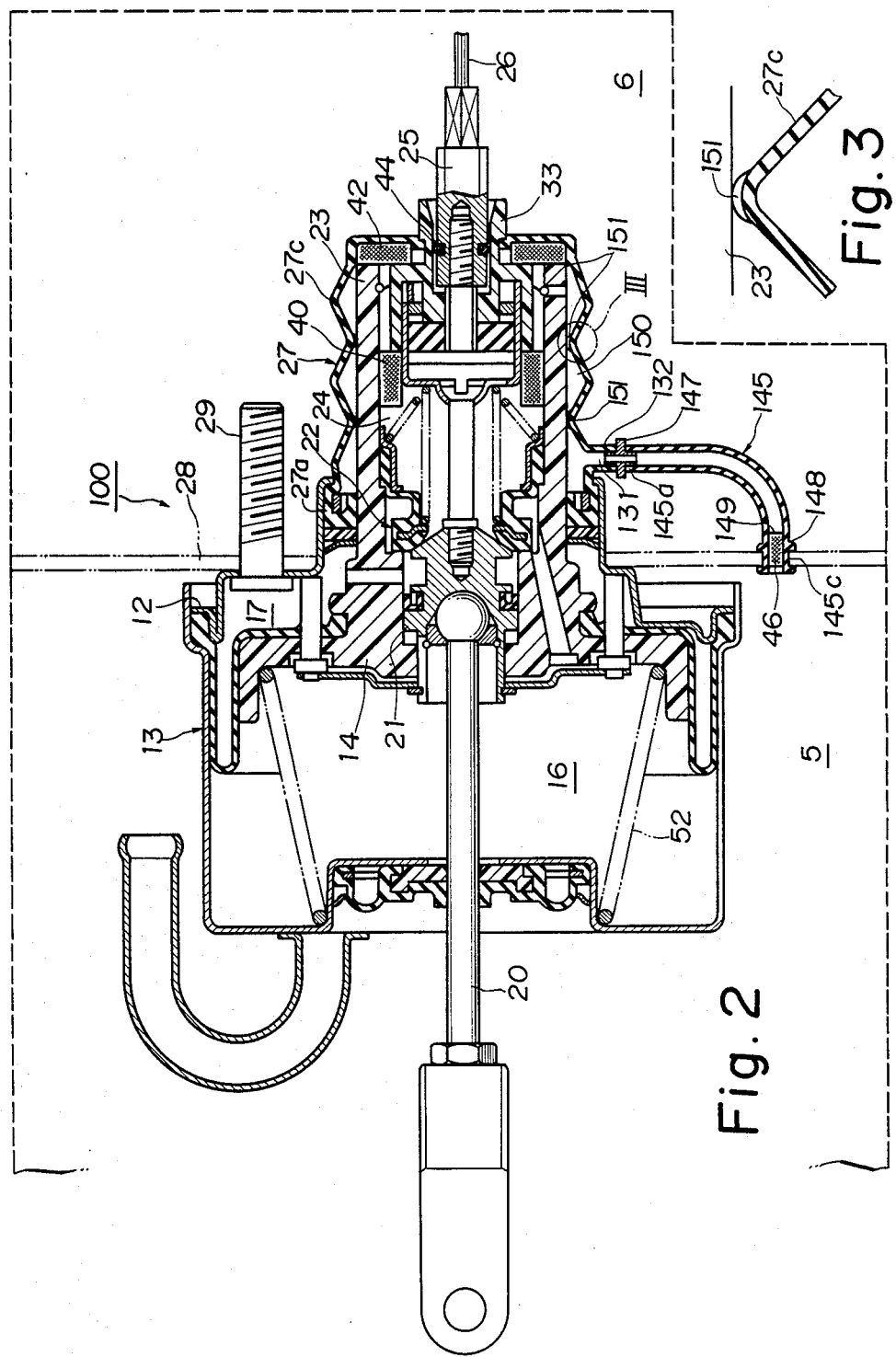

PULL-TYPE BOOSTER

This is a continuation of co-pending application Ser. No. 817,902 filed on Jan. 10, 1986, now abandoned.

BACKGROUND OF THE INVENTION

1. Field of the Invention

This invention relates to a pull-type booster for use in brake and/or clutch systems of an automotive vehicle.

2. Prior Art

Generally, the pull-type booster under consideration comprises a hollow body of the interior is divided into a negative pressure chamber and a pressure-variable chamber by a movable member which is movable relative to the hollow body. The negative pressure chamber is connected to a vacuum source such as an intake manifold of an engine while the pressure-variable chamber is selectively caused to communicate with either of the negative pressure chamber and the atmosphere through valve means. The movable member has an inlet for introducing the air into the pressure-variable chamber through a bore therein when the valve means causes the pressure variable chamber to communicate with the atmosphere. As is well known in the art, a boosting force is produced by a pressure differential created between the negative pressure chamber and the pressure-variable chamber. The booster is mounted on a partition wall, dividing the interior of the vehicle body into a passenger room and an engine room, in such a manner that the above-mentioned inlet is disposed within the engine room. When the engine room is cleaned with washing water, the washing water fed in a jet from a water hose or the like is atomized into mist upon impinging on parts in the engine room and an inner wall thereof. The water mist tends to intrude into the interior of the booster through the inlet. Although a filter member is attached to the inlet for arresting dust and the like, it will not prevent the water mist and the jet of water from intruding into the booster.

SUMMARY OF THE INVENTION

It is therefore an object of this invention to provide a pull-type booster capable of preventing washing water from intruding into the interior of the booster.

According to the present invention, there is provided a pull-type booster adapted to be mounted on a partition wall mounted on a body of a vehicle to divide the interior of the body into first and second rooms, said booster comprising:

(a) a hollow body having an axis therethrough;
(b) a movable wall received in said hollow body to divide an interior thereof into a negative pressure chamber connectable to a negative pressure source and a pressure-variable chamber, said movable wall being movable relative to said body along the axis thereof and including a tubular portion extending outwardly of said body, said tubular portion having an axial internal bore, said tubular portion being adapted to extend through the partition wall into the first room, and said movable wall having a passageway communicating said pressure-variable chamber with said internal bore;
(c) a tubular cover member mounted around said tubular portion to cover it, said cover member having an inlet in communication with said internal bore;
(d) an air tube having one end connected to said inlet, the other end of said air tube being adapted to be disposed outside of said first room;
(e) an input member extending into said body for movement along the axis thereof;
(f) valve means mounted within said internal bore and connected to said input member for communicating said inlet with said pressure variable chamber through said internal bore and said passageway to introduce the air in the second room into said pressure-variable chamber via said air tube when said input member is moved in a direction away from said body, thereby moving said movable wall along the axis of said body due to a pressure differential between said negative pressure chamber and said pressure-variable chamber; and
(g) an output member operatively connected to said movable wall for movement therewith.

BRIEF DESCRIPTION OF THE DRAWINGS

FIG. 1 is a cross-sectional view of a pull-type booster provided according to the present invention;

FIG. 2 is a view similar to FIG. 1 but showing a modified booster; and

FIG. 3 is an enlarged cross-sectional view of a portion of a cover member incorporated in the booster of FIG. 2.

DESCRIPTION OF THE PREFERRED EMBODIMENTS OF THE INVENTION

The invention will now be described with reference to the accompanying drawings in which like reference numerals denote corresponding parts in several views.

A pull-type booster 10 shown in FIG. 1 comprises a hollow body 13 composed of generally cup-shaped front and rear shells 12 and 11 which are connected together at their outer peripheral portions. An elastic diaphragm 15 is disposed within the body 13 with an outer peripheral edge thereof clamped between the outer peripheral portions of the front and rear shells 12 and 11. A movable member 14 has at a rear end a flange 14a fitted in the diaphragm 15 and a tubular portion 23 extending from the flange 14a, the tubular portion 23 extending through the diaphragm 15 and the front shell 12. The inner peripheral edge of the diaphragm 15 is held between the flange 14a and an annular projection 14b formed on the tubular portion 23 adjacent to the flange 14a, so that the movable member 14 is secured to the diaphragm 15. The movable member 14 and the diaphragm 15 cooperate with each other to provide a movable wall which divides the interior of the body 13 into a rear negative chamber 16 and a front pressure-variable chamber 17.

The movable member 14 has an internal bore 24 extending axially therethrough, the bore 24 communicating with the atmosphere as later described. A plunger 21 is slidably received in the bore 24, and an input rod 20 extends through the rear shell 11 and is secured at one end to the plunger 21. A tubular valve member 22 is received in the bore 24. The plunger 21 has a first valve seat 21a at one end remote from the input rod 20. A second valve seat 50 is formed on the surface of the internal bore 24. The first and second valve seats 21a and 50 and the valve member 22 jointly provide valve means. When the booster is in its inoperative condition, the valve member 22 is seated on the first valve seat 21a of the plunger 21 and is spaced apart from the second valve seat 50, so that the two chambers 16 and 17 are in communication with each other via a passageway 18 formed in the movable member. In this condition, the two chambers 16 and 17 are maintained under a negative pressure or vacuum since the negative pressure chamber 16 is connected to a source of vacuum such as a intake manifold of an engine. When the input rod 20 is pulled, the first valve seat 21a of the plunger 21 is moved away from the valve member 22, so that the pressure-variable chamber 17 is caused to communicate with the atmosphere via a passageway 19 and the internal bore 24 of the movable member 14, thereby creating a pressure differential between the negative pressure chamber 16 and the pressure-variable chamber 17. As a result, the movable member 14 is moved rearwardly, so that a clutch wire 26 operatively connected to a clutch is pulled or moved rearwardly via a rod 51, a tubular member 41, a connecting member 3 and an output member 25. The booster of this general type is described in more detail in U.S. patent application Ser. Nos. 591,005 and 591,006 filed on Mar. 19, 1984.

In the booster 10, a preloaded spring 52 acts between the rear shell 11 and the movable member 14 for urging the movable member 14 forwardly. Therefore, in the inoperative condition, the movable wall 14 is urged forwardly by the preloaded spring 52, so that a portion of the diaphragm 15 is held against the inner surface of the front shell 12. At this time, since the plunger 21 and the rod 51 are urged forwardly by the valve spring 53, conventionally, the valve member 22 is seated on the first valve seat 21a but is spaced substantially from the outer second valve seat 50 as is not the case with the illustrated condition. This spacing between the valve member 22 and the second valve seat 50 has been the main cause of a play in the initial operation of the booster 10. In order to eliminate or reduce such a play in the initial operation, the booster 10 is of the following construction. The booster 10 comprises a pair of pins 54 movably received, in a pair of axial holes 55 in the outer peripheral portion of the flange 14a of the movable member 14, and an operating member 56 connected to the ends of the pins 54 disposed in the rear negative chamber 16. The pins 54 and the operating member 56 are moved in unison. The inner edge of the operating member 56 is engageable with a forward surface of a C-shaped retaining member 57 mounted around the plunger 21 adjacent to its rear end and disposed perpendicularly to the axis of the plunger 21. With this arrangement, the retaining member 57 is engageable with the inner edge of the operating member 56 to limit the forward movement of the plunger 21 relative to the movable member 14. The pins 54 and the operating member 56 are of such construction that the movable member 14 is rearwardly movable relative to the plunger 21 to bring the second valve seat 50 into engagement with the valve member 22. And, the second valve seat 50 is held in sealing engagement with the valve member 22 in this manner in the inoperative condition of the booster 10. The pins 54 and the operating member 56 cooperate with each other to limit the forward movement of the plunger 21 in such a manner that the valve member 22 is seated on both of the first and second valve seats 21a and 50 in the inoperative condition of the booster 10. This eliminates the retarding of the initiation of the operation of the booster 10.

A bellows-like cover member 27 made of rubber is fitted over the tubular portion 23, and a rear end 27a of the cover member 27 is interposed between the front end of the front shell 12 and the tubular portion 23 and is secured thereto by a snap ring 30. The cover member 27 has a front end wall 27b and a tubular portion 32 formed on and extending outwardly from the front end wall 27b, the tubular portion 32 having a bore 31 extending axially therethrough which bore is in communication with the internal bore 24 through an open front end of the tubular portion 23. The bore 31 serves as an inlet for introducing the air into the pressure-variable chamber 17 as will hereinafter be more fully described. A block 33 made of a plastics material is of a stepped cylindrical shape and is received in a front end portion of the tubular portion 23 and extends outwardly through the front end wall 27b of the cover member, the block 33 being retained in place by a retainer ring 34 engaged with the outer periphery of the block. Formed through the peripheral wall of the tubular portion 23 is an aperture 35 for removing the retainer ring 34. The aperture 35 is so positioned that it will not reach the rear end 27a of the cover member 27 when the movable member 14 moves rearwardly.

The block 33 has an axial bore 36 through which the output member 25 is passed, the block 33 having a plurality of axial air passageways 37 formed in the outer periphery thereof in circumferentially spaced relation. The tubular member 41 is received in a rear portion of the block 33, and the connecting member 3 and the rubber disc 38 are received in the tubular member 41. A first filter ring 40 is received in the internal bore 24 and covers rear ends of the passageways 37 and is interposed between the inner peripheral surface of the tubular portion 23 and the tubular member 41. A second filter ring 42 is held against the front end of the tubular portion 23 by the front end wall 27b of the cover member 27 and covers the front ends of the passageways 37. A front portion 41a of the block 33 is snugly fitted in an aperture 27c formed through the front end wall 27b. An annular groove 43 is formed in an inner surface of the front end wall 17b, so that an annular space is defined by the second filter ring 42 and the front end wall 27b of the cover member 27. Therefore, the ambient air introduced through the bore 31 of the tubular portion 32 can be passed through the second filter ring 42 over a greater area thereof. A seal ring 44 fitted around the output member 25 prevents washing water from intruding between the output member 25 and the block 33. An air tube 45 made of rubber has one end 45b snugly fitted in the tubular portion 32 of the cover member 27 while the other end 45c of the air tube 45 is press fitted in an aperture 46 formed through a partition wall 28. A pair of closed spaced ridges 45d and 45e are formed on the outer periphery of the air tube 45 at the other end 45c to define a peripheral groove, and the edge of the aperture 46 is snugly received in this peripheral groove, so that the other end 45c is sealingly secured to the partition wall 28. The air tube 45 has a bellows portion 45a intermediate the opposite ends thereof so that the air tube 45 follows the movement of the movable member 14.

The booster 10 is mounted in a body 4 of a vehicle, and the partition wall 28 divides the vehicle body 4 into a passenger room 5 and an engine room 6 in which an engine (not shown) is mounted. The bore 31 of the tubular portion 32 of the cover member 27 serving as an air inlet for the booster 10 opens not to the engine room 6 but to the passenger room 5 by the provision of the air tube 45. Therefore, when the engine room is washed with water or the like, the washing water is prevented from intruding into the interior of the booster 10 via the bore 31. And, the ambient air is introduced through the air tube 45, the bore 31, the internal bore 24 and the passageway 19 into the pressure variable chamber 17 when the input rod 20 is pulled to move the first valve seat 21a of the plunger 21 away from the valve member 22, thereby creating a pressure differential between the negative pressure chamber 16 and the pressure-variable chamber 17.

FIG. 2 shows a modified booster 100 which differs from the booster 10 of FIG. 1 in that the tubular portion 32 is omitted and that an air tube 145 of rubber is connected to the peripheral wall of the cover member 27 adjacent to the rear end 27a thereof, so that the deformation of the air tube, caused when the movable member 14 is moved, is kept to a minimum. More specifically, the cover member 27 has a tubular portion 132 on the peripheral surface thereof adjacent to the front end of the front shell 12 to which the rear end 27a of the cover member 27 is secured, the tubular portion 132 having a bore 131 extending axially therethrough. One end of the air tube 145 is connected to the tubular portion 132 through a flanged fitting 147. The other end 145c of the air tube 145 is snugly fitted in an aperture 46 of the partition wall 28, and a filter member 148 is fitted in the other end 145c. Formed on the inner surface of the other end 145c is a peripheral ridge 149 which serves as a stop abutment for the filter member 148. The filter member 148 serves to arrest foreign matters such as dust entrained in the air introduced into the other end 145c, and therefore clean air is supplied to the bore 131. The air passed through the bore 131 flows through an annular space 150 defined between the inner peripheral surface of the cove member 27 and the outer peripheral surface of the tubular member 23 of the movable member 14. As best shown in FIG. 3, a plurality of circumferentially spaced projections 151 are formed on each of reduced diameter portions of the peripheral wall of the bellows-like cover member 27 to allow the flow of the air. These projections 151 may be replaced by a plurality of circumferentially spaced notches formed in each reduced diameter portion. Since the air tube 145 is subjected to less deformation, the air tube 145 is used for a prolonged period of time. Since in this embodiment, the filter member 148 is fitted in the other end 145c of the air tube 145, the filter ring 142 disposed downstream of the filter member 148 may be omitted.

While the boosters according to the present invention have been specifically shown and described herein, the invention itself is not to be restricted by the exact showing of the drawings or the description thereof. For example, although the other end 45c, 145c of the air tube 45, 145 opens to the passenger room 5, the other end may be positioned in such a location where the washing water is not admitted into it, such as a location between a connecting tube connecting an air cleaner to a carburetor. Further, a fastening means such as a band may be attached onto the tubular portion 32, 132 for preventing the one end 45b, 145a of the air tube 45, 145 from becoming disengaged therefrom.

What is claimed is:

1. A pull-type booster adapted to be mounted on a partition wall mounted on a body of a vehicle to divide the interior of the body into a first engine and a second passenger room, said booster comprising:
   (a) a hollow body having an axis therethrough;
   (b) a movable wall received in said hollow body to divide an interior thereof into a negative pressure source and a pressure-variable chamber, said movable wall being movable relative to said body along the axis thereof and including a tubular portion extending outwardly of said body, said tubular portion having an axial internal bore, said tubular portion being adapted to extend through the partition wall into the first room, said movable wall having a passageway communicating said pressure-variable chamber with said internal bore;
   (c) a tubular cover member mounted around said tubular portion to cover it, said cover member having an inlet in communication with said internal bore;
   (d) an air tube having one end connected to said inlet, the other end of said air tube being adapted to be secured to said partitional wall and to have an opening into said second passenger room whereby air from said second passenger room can enter said air tube through said opening;
   (e) an input member extending into said body for movement along the axis thereof;
   (f) valve means mounted within said internal bore and connected to said input member for communicating said inlet with said pressure-variable chamber through said internal bore and said passageway to introduce the air in the second room into said pressure-variable chamber via said air tube when said input member is moved in a direction away from said body, thereby moving said movable wall along the axis of said body due to a pressure differential between said negative pressure chamber and said pressure-variable chamber;
   (g) an output member operatively connected to said movable wall for movement therewith, said connection occurring by means of a connecting portion comprising a screw fastener capable of making a length adjustment, said connecting portion being located in the interior of a block, a seal ring is fitted around said output member to prevent washing water from intruding into the connecting portion;
   (h) said block is of stepped cylindrical shape and is received in a front end portion of said tubular portion.

2. A pull-type booster according to claim 1, in which said tubular cover member has at one end an end wall disposed in opposed relation to one end of said tubular portion disposed outwardly of said body, said inlet being provided in said end wall.

3. A pull-type booster according to claim 1, in which said inlet is provided in a peripheral wall of said tubular cover member, said cover member and said tubular portion defining an annular space therebetween, and said annular space being in communication with said internal bore.

4. A pull-type booster according to claim 3, in which said inlet is disposed adjacent to said body.

5. A pull-type booster according to claim 1, in which said cover member is flexible.

6. A pull-type booster according to claim 3 or claim 4, in which a filter member is fitted in said other end of said air tube.

7. A pull-type booster according to claim 1, in which one end of said tubular portion disposed outwardly of said body is open, said cover member having at one end an end wall disposed in opposed relation to said one end of said tubular portion, a filter member being interposed between said end wall and said one end of said tubular portion, and an annular groove is formed in an inner surface of said end wall facing said filter member.

* * * * *